United States Patent [19]

Kume et al.

[11] Patent Number: 5,780,142

[45] Date of Patent: Jul. 14, 1998

[54] PATTERN-FORMING SHEET AND LABEL COMPRISING SAME

[75] Inventors: Katsuya Kume; Itsuroh Takenoshita; Katsuyuki Okazaki; Mitsuo Kuramoto; Kihachi Suzuki, all of Osaka, Japan

[73] Assignee: Nitto Denko Corporation, Osaka, Japan

[21] Appl. No.: 639,907

[22] Filed: Apr. 26, 1996

[30] Foreign Application Priority Data

Apr. 27, 1995 [JP] Japan ................... 7-128951
Jun. 29, 1995 [JP] Japan ................... 7-186375

[51] Int. Cl.$^6$ ........................................ B32B 3/00
[52] U.S. Cl. ............... 428/195; 428/204; 428/304.4; 428/343; 428/402; 428/411.1; 428/447; 428/448; 428/500; 428/688; 428/913
[58] Field of Search ..................... 428/195, 204, 428/304.4, 343, 402, 411.1, 447, 448, 688, 913

[56] References Cited

U.S. PATENT DOCUMENTS

| | | | |
|---|---|---|---|
| 4,293,599 | 10/1981 | Hori et al. | 427/274 |
| 4,971,858 | 11/1990 | Yamano et al. | 428/323 |
| 5,008,151 | 4/1991 | Tominaga et al. | 428/343 |
| 5,204,289 | 4/1993 | Moh | 501/5 |
| 5,209,796 | 5/1993 | Sakuramoto et al. | 156/89 |
| 5,578,365 | 11/1996 | Kume et al. | 428/195 |

*Primary Examiner*—William Krynski
*Attorney, Agent, or Firm*—Sughrue, Mion, Zinn, Macpeak & Seas, PLLC

[57] ABSTRACT

A pattern-forming sheet or label which is so flexible as to be expediently patterned, can provide a heat resistant or chemical resistant pattern to a product to be labeled, and can be subjected to high temperature atmosphere without burning treatment is provided, comprising a bonded laminate of a base layer obtained by shaping a low-melting glass powder into a sheet with a low-temperature decomposable acrylic polymer, and an ink-receptive layer made of a silicone resin layer containing an inorganic powder. Further, a novel label is provided, having a transfer pattern made of an ink containing an inorganic colorant formed on the ink-receptive layer of the pattern-forming sheet.

29 Claims, 1 Drawing Sheet

PATTERN-FORMING SHEET AND LABEL COMPRISING SAME

FIELD OF THE INVENTION

The present invention relates to a pattern-forming sheet suitable for use in the formation of an identification label or the like which exhibits a high concealing power, a high reflectance and an excellent chemical resistance and can be subjected to high temperature atmosphere without burning treatment. The present invention also relates to a label comprising a pattern formed on this pattern-forming sheet.

BACKGROUND OF THE INVENTION

The industrial trend is for more types of products to be produced in smaller amounts. In this trend, as a label which can be simply used to control products, semi-finished products, and parts made of heat-resistant plastics, metals, glasses, burned ceramics, etc. there has been known a label obtained by patterning with a glass powder-containing ink a pattern-forming sheet produced by shaping a glass powder with a heat-decomposable organic binder. This label is tentatively attached to a product to be labeled, and then burned to form a burned pattern.

This label is so flexible as to be expediently patterned. When the label is burned, a burned pattern can be fixed to a product to be labeled. Accordingly, many difficulties with the conventional substrate type labels made of burned ceramics, metals, enameled bodies, etc. can be overcome. For example, these conventional substrate type labels cannot be fixed to a curved surface due to its rigidity. Further, these conventional substrate type labels cannot be expediently formed because they can hardly be patterned in situ. Moreover, these conventional substrate type labels cannot be available in many varieties as is required to control individual parts in the above-described industrial trend for more types of products to be produced in smaller amounts. Still further, these conventional substrate type labels cannot be easily fixed because they must be fixed by a screw.

However, the above conventional label is disadvantageous in that the glass powder contained in ink forming the pattern must be burned to fix the pattern while attaining the weathering resistance or heat resistance of the pattern-forming sheet. Further, when the sheet is burned, the organic components contained in the sheet are partially carbonized, causing a change of the concealing power which can reduce the contrast with the product or pattern. Further, if a low-melting glass such as lead glass is used in an increased amount so as to burn at low temperatures, the patterned ink is apt to elution which gives a defective or disturbed pattern when dipped in a chemical such as a hot alkaline solution or strong acid solution. Thus, it has been impossible to provide a label is excellent in chemical resistance and which can be burned at low temperatures.

SUMMARY OF THE INVENTION

It is therefore one object of the present invention to provide a pattern-forming sheet that is so flexible as to be expediently patterned, that can provide a heat resistant or chemical resistant pattern to the product to be labeled, and that can be subjected to a high temperature atmosphere without burning treatment.

It is another object of the present invention to provide a label comprising the pattern-forming sheet.

The present invention provides a pattern-forming sheet comprising a bonded laminate of a base layer obtained by shaping a low-melting glass powder into a sheet with a low-temperature decomposable acrylic polymer, and an ink-receptive layer made of a silicone resin layer containing an inorganic powder.

The present invention also provides a label comprising a transfer pattern made of an ink containing an inorganic colorant formed on the ink-receptive layer in the sheet.

In the present invention, a pattern-forming sheet or label can be obtained which is so flexible as to come into contact with any curved surface, can be expediently patterned or marked with an identification form by various methods such as engraving, punching, heat transfer and printing, can have an ink firmly fixed thereto even by a heat transfer process or the like to have a pattern with excellent adhesiveness and can be used without burning treatment. Further, the pattern-forming sheet or label of the present invention can be tentatively attached to the product to be labeled, and then put in a heating atmosphere so that it can be subjected to a treatment corresponding to burning. Accordingly, there is no necessity for burning the sheet or label before use.

Further, since burning can be avoided as mentioned above, the label of the present invention is insusceptible to carbonization that causes coloration. Thus, the label of the present invention can maintain a high concealing power and a good reflectance to inhibit reduction of the pattern contrast. The label of the present invention is more resistant to hot alkaline and strong acid than a low-melting glass having a large content of lead glass. The label of the present invention can be firmly bonded to a product to be labeled through the glass powder contained in the base layer or the silicone resin in the ink-receptive layer when heated to a low temperature during the thermal decomposition of the adhesive layer. The pattern thus formed exhibits excellent heat resistance, weathering resistance, chemical resistance, strength, concealing power and contrast.

BRIEF DESCRIPTION OF THE DRAWINGS

By way of example and to make the description more clear, reference is made to the accompanying drawings in which.

DETAILED DESCRIPTION OF THE INVENTION

Figure 1:
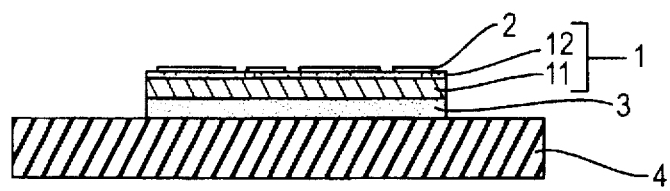
FIG. 1 is a sectional view illustrating an embodiment of the label according to the present invention.

The pattern-forming sheet of the present invention comprises a bonded laminate of a base layer obtained by shaping a low-melting glass powder into a sheet with a low-temperature decomposable acrylic polymer, and an ink-receptive layer made of a silicone resin layer containing an inorganic powder. An embodiment of the pattern-forming sheet of the present invention is shown in FIG. 1. Shown at the reference numerals 1, 11 and 12 are a pattern-forming sheet, a base layer and an ink-receptive layer, respectively. Shown at the reference numerals 2, 3 and 4 are a pattern layer, a pressure-sensitive adhesive layer which is optionally provided, and a product to be labeled, respectively. Accordingly, FIG. 1 illustrates an embodiment of the pattern-sheet of the present invention tentatively attached to the product in the form of label.

The pattern-forming sheet may be provided in the form of a sheet comprising a bonded laminate of a base layer and an ink-receptive layer. Accordingly, the pattern-forming sheet may be shaped into any proper form. Examples of such a form include a two-layer form consisting of a base layer and an ink layer (FIG. 1), and a composite form comprising a base layer 11 reinforced by a reinforcing substrate 13 and an adhesive layer as shown in FIG. 2.

Figure 2:
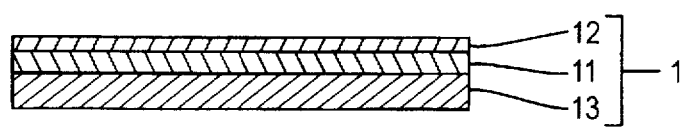
FIG. 2 is a sectional view illustrating an embodiment of the pattern-forming sheet according to the present invention.

The above composite form may be formed by providing a base layer on the reinforcing substrate as shown in FIG. 2. Alternatively, the composite form may be formed by impregnating the reinforcing substrate with a base layer-forming material. Further, the composite form may be formed by interposing the reinforcing substrate in the base layer. Examples of such a reinforcing substrate that can be used include proper materials such as a resin-coated layer, film, inorganic sheet (e.g., glass), an organic or inorganic fiber, cloth, nonwoven cloth, metal foil, and net.

From the volatility of decomposition gases generated by burning and the smoothness of the resulting label, a porous reinforcing substrate such as porous film, fiber cloth or nonwoven cloth is preferably used. The reinforcing substrate may be formed by a material which can thermally decompose upon heat treatment, such as a polymer made of polyester, polyimide, fluororesin, polyamide, etc. or a material which does not thermally decompose upon heat treatment, such as glasses, ceramics and metals.

The base layer may be formed by shaping a low-melting glass powder into a sheet form with a low temperature-decomposable acrylic polymer. Such a glass powder that can be used is a glass powder which can soften or melt at a temperature lower than that of the heating atmosphere in which the product to which the label is tentatively attached is placed to bond the label to the product to be labeled. The base layer helps to accomplish the bonding of the label to the product through the molten glass powder and the retention of the ink-receptive layer. Accordingly, the glass powder which can be used includes proper materials depending on the temperature of the heating atmosphere. In general, a material having a softening point of from 320° to 500° C. (at $10^7$ poises) such as lead glass and borosilicate glass having a high lead oxide content is used.

The acrylic polymer which can be used includes proper materials that can decompose at a temperature lower than the melting temperature of the glass powder to be used in combination. In general, an acrylic polymer which can melt at a temperature 50° C. or more, and preferably 70° C. or more, lower than the melting point of the glass powder, and can finish decomposition at a temperature of from 250° C. to 450° C. is used. Preferred examples of such an acrylic polymer include a methacrylate polymer made of an alkyl ester of methacrylic acid as a constituent.

The base layer may optionally comprise a silicone resin incorporated therein for the purpose of maintaining the strength upon heat treatment. The amount of the silicone resin to be incorporated in the base layer is properly determined by the heating temperature or required strength of the label but is normally not more than 100 parts by weight, preferably not more than 50 parts by weight, and more preferably from 1 to 20 parts by weight, per 100 parts by weight of the acrylic polymer used.

The silicone resin to be incorporated in the base layer is a silicone resin having a proper heat resistance such as those exemplified with reference to the following ink-receptive layer. In general, a straight type silicone resin such as polyphenyl methyl siloxane may be used depending on the heating temperature of the label. Where heat resistance is particularly required, a ladder silicone resin may be used.

The ink-receptive layer may be in the form of a silicone resin layer containing an inorganic powder. The silicone resin layer may further comprise other organic binders made of a low temperature-decomposable resin incorporated therein. Such a silicone resin that can be used is a silicone resin which can undergo decomposition and condensation when heated, e.g., to a temperature of 200° C., to give a cured product which eventually turns to silica. Such a silicone resin can provide an ink-receptive layer having an excellent heat resistance.

Accordingly, proper silicone resins can be used as such a silicone resin. Examples of the silicone resin include silicone resins having a structural unit such as $R_3SiO$, $R_3SiO_{1/2}$, $R_2SiO_2$, $R_2SiO$, $RSiO_2$, $SiO_2$ and $RSiO_{3/2}$ (wherein R represents an organic group such as an aliphatic hydrocarbon group (e.g., methyl, ethyl, propyl), an aromatic hydrocarbon group (e.g., a phenyl group), an olefin group (e.g., vinyl), or a hydrolyzable group such as a hydroxyl group), and silicone resin modified by alkyd, phenol, melamine, epoxy, polyester, acryl, urethane, etc.

Preferred examples of such a silicone resin include polyorganosiloxanes such as polymethyl siloxane and polyphenyl methyl siloxane. Preferred among these polyorganosiloxanes is one capable of forming a film having good shape retention and flexibility, particularly one having a hydrolyzable group such as a hydroxyl group. Where the label is exposed to high temperatures up to about 500° C., a polymethyl siloxane that exhibits small heat loss and small shrinkability is particularly preferred.

The object of the inorganic powder to be incorporated in the ink-receptive layer is to enhance the heat resistance of the ink-receptive layer (up to about 800° C.) and to provide the label with a background color. Accordingly, one or more kinds of proper materials such as metal powders and ceramic powders may be used. The particle diameter of the inorganic powder is generally 50 μm or less, and preferably from 0.05 to 20 μm, but the present invention is not limited thereto. The inorganic powder is advantageously attached to mother flakes such as mica to give a flake powder which is then incorporated in the ink-receptive layer to enhance the concealing power and reflectance thereof.

Examples of the inorganic powder generally used herein include white matters such as silica, titania, alumina, zinc oxide, zirconia, calcium oxide and mica. Further examples of the inorganic powder include metal compounds that can be oxidized at a temperature lower than the heat treatment temperature of the label to turn to an oxidation type white ceramic, such as carbonate, nitrate and sulfate. Where an identification label is formed, a white ink-receptive layer comprising a white inorganic powder incorporated therein is often employed from the standpoint of contrast.

Representative examples of other color system inorganic powders include red matters containing metallic ions such as iron, copper, gold, chromium and selenium ions (e.g., manganese oxide-alumina, chromium oxide-tin oxide, iron oxide, cadmium sulfate-selenium sulfate), blue matters containing metallic ions such as manganese, cobalt, copper and iron ions (e.g., cobalt oxide, zirconia-vanadium oxide, chromium oxide-divanadium pentaoxide), and black matters containing metallic ions such as iron, copper, manganese, chromium and cobalt ions (e.g., chromium oxide-cobalt oxide, iron oxide-manganese oxide, chromate, permanganate).

Further examples of other color system inorganic powders include yellow matters containing metallic ions such as vanadium, tin, zirconium, chromium, titanium and antimony ions (e.g., zirconium-silicon-praseodymium, vanadium-tin, chromium-titanium-antimony), green matters containing metallic ions such as chromium, aluminum, coboxide, cobalt-chromium,.g., chromium oxide, cobalt-chromium, alumina-chromium), and rosy matters containing metallic ions such as iron, silicon, zirconium, aluminum and manganese ions (e.g., aluminum-manganese, iron-silicon-zirconium).

The formation of the pattern-forming sheet comprising a bonded laminate of a base layer and an ink-receptive layer can be accomplished by a process which comprises mixing one or more glass powders and acrylic polymers with an organic solvent in a ball mill or the like, spreading the mixture over a support such as reinforcing substrate and separator as necessary by a proper process to form a base layer, and then spreading a mixture obtained by mixing one or more inorganic powders and silicone resins with an organic solvent in a ball mill over the base layer by a proper process to form an ink-receptive layer.

In the above process, the mixing proportion of the glass powder and the acrylic polymer (base layer) and the mixing proportion of the inorganic powder and the silicone resin (ink-receptive layer) may be properly determined depending on the handleability of the pattern-forming sheet and the strength and concealing power of the label. In general, the acrylic polymer or silicone resin is used in an amount of from 20 to 300 parts by weight, and preferably from 50 to 150 parts by weight, per 100 parts by weight of the glass powder or inorganic powder.

A proper organic solvent can be used as the organic solvent for the preparation of the mixture. In general, toluene, xylene, butyl carbitol, ethyl acetate, butyl cellosolve, methyl ethyl ketone, methyl isobutyl ketone, etc. may be used. Preferably, the mixture is homogeneously prepared such that the solid content concentration is from 5 to 85% by weight from the standpoint of spreadability, though not limiting. During the preparation of the mixture, a proper additive such as a dispersant, plasticizer and combustion improver may be incorporated in the compound as necessary.

The spreading of the mixture over the support is preferably accomplished by a process having good control over layer thickness, e.g., doctor blade coating process and gravure roll coating process. This spreading process is preferably effected with a defoamer or the like so that the spread layer is thoroughly defoamed, leaving no foam therein. The thickness of the pattern-forming sheet thus formed, particularly the base layer, is properly determined but is normally from 10 μm to 5 mm, particularly from 20 to 200 μm. If the thickness of the pattern-forming sheet is below 10 μm, the sheet lacks strength. On the contrary, if the thickness of the pattern-forming sheet exceeds 5 mm, the sheet can easily crack during heat treatment. The thickness of the ink-receptive layer is preferably not less than 1 μm, and preferably from 3 μm to 1 mm, from the standpoint of the fixability of the ink pattern, but the present invention is not limited thereto.

The pattern-forming sheet may be in a proper form such as vented form for the purpose of smooth volatilization of the decomposition gas upon heating. For example, when an adhesive layer, if provided for tentative attachment, is heated to not lower than 200° C., it produces a decomposition gas that inflates the pattern-forming sheet. A countermeasure is desired.

Figure 3:
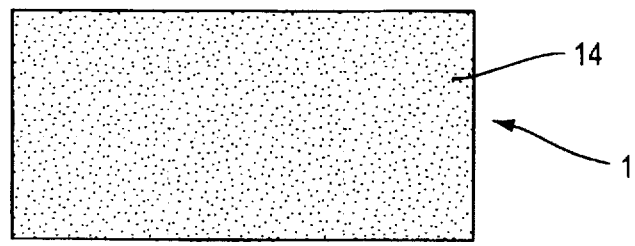
FIG. 3 is a sectional view illustrating another embodiment of the pattern-forming sheet according to the present invention.

Examples of the vented pattern-forming sheet include a vented form obtained by making fine through-holes 14 in a pattern-forming sheet 1 by a punching process or the like as shown in FIG. 3, and a porous substrate form obtained by a proper process, e.g., by incorporating a woven cloth, nonwoven cloth, metal foil or film having numerous fine pores therein as a reinforcing substrate.

Figure 4:
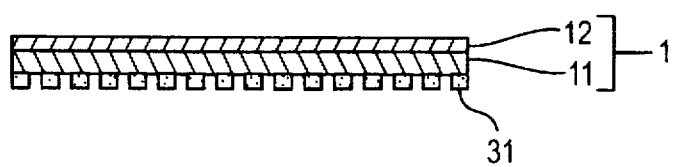
FIG. 4 is a sectional view illustrating a further embodiment of the pattern-forming sheet according to the present invention, wherein the reference numeral 1 indicates a pattern-forming sheet, the reference numeral 2 indicates a pattern layer, the reference numeral 3 indicates a pressure-sensitive adhesive layer, the reference numeral 4 indicates a product to be labeled, the reference numeral 11 indicates a base layer, the reference numeral 12 indicates an ink-receptive layer, the reference numeral 13 indicates a reinforcing substrate, the reference numeral 14 indicates a fine through-hole, and the reference numeral 31 indicates a dotted pressure-sensitive adhesive layer.

Another effective approach is to incorporate a degasser made of an inorganic powder having a higher melting temperature than the glass powder used therewith in the base layer of the pattern-forming sheet. The inorganic powder that can be used is an inorganic powder exemplified with reference to the ink-receptive layer. An alternative effective approach is to arrange the adhesive layer in a dotted pattern so that a passage is formed on the adhesive layer side. In this arrangement, it is more preferred that the pattern-forming sheet be porous. FIG. 4 illustrates a pattern-forming sheet 1 comprising a pressure-sensitive adhesive layer 31 arranged in a dotted pattern.

Alternatively, the pattern-forming sheet can be provided with pores for volatilizing the decomposition gas by incorporating a low temperature-decomposable resin in the base layer or ink-receptive layer during the formation of the pattern-forming sheet. In this arrangement, the low temperature-decomposable resin decomposes away to form a porous layer before the silicone resin becomes a hard film upon heat treatment. The subsequently produced decomposition gas volatilizes smoothly through these pores. Accordingly, for the purpose of volatilizing gas produced by the decomposition of the organic components constituting the pressure-sensitive adhesive layer, a low temperature-decomposable resin which can decompose at a temperature lower than the organic components constituting the pressure-sensitive adhesive layer is preferably used.

Such a low temperature-decomposable resin preferably used is a resin which can also serve as a binder for inorganic powder. Examples of such a low temperature-decomposable resin include hydrocarbon resins, vinyl resins, styrene resins, acetal resins, butyral resins, acrylic resins, polyester resins, urethane resins, cellulose resins, and fiber resins. Particularly preferred among these low temperature-decomposable resins is acrylic resin. The amount of the low temperature-decomposable resin to be incorporated in the base layer or ink-receptive layer is normally not more than 50% by weight of the main binder component such as silicone resin. The low temperature-decomposable resin may be incorporated in the form of a solid such as powder.

The pattern-forming sheet of the present invention is preferably used as follows. In some detail, the pattern-forming sheet of the present invention may be tentatively attached to a product to be labeled as it is or in the form of a patterned label before the product is exposed to an atmosphere having a high temperature of about 500° C. or lower. In this process, the pattern-forming sheet or label may be or may not be previously burned.

Where the unburned pattern-forming sheet or label is used, when the product to which the sheet or label has been tentatively attached is put in a heating atmosphere, the organic components decompose, volatilize, penetrate the glass powder in the base layer or the cured silicone resin in the ink-receptive layer, and then adhere to the product to be labeled. Accordingly, the pattern-forming sheet of the present invention can also be used as an adhesive for binding an adherend to the product to be labeled. In some detail, the adherend is previously attached to the pattern-forming sheet which is then heated to bond the adherend to the product through the material thus heat-treated in the substrate.

The pattern-forming sheet may optionally comprise a pressure-sensitive adhesive layer incorporated therein to enhance its adhesiveness to the product to be labeled. The adhesive layer may be provided in a proper stage until the product to which the pattern-forming sheet has been tentatively attached is subjected to heat treatment. Accordingly, the adhesive layer may be provided before or after patterning the pattern-forming sheet.

The adhesive layer may be formed by a proper organic or inorganic adhesive substance having a tentative adhesiveness to the product to be labeled. Such an adhesive substance used is a proper substance depending on the heating temperature or other conditions. Examples of such an adhesive substance include inorganic adhesives such as silicate adhesives, silicone adhesives, rubber adhesives, acrylic adhesives, vinyl alkyl ether adhesives, and epoxy adhesives.

Where heating to a temperature of higher than 400° C. is involved, an organic adhesive that can decompose away at relatively low temperatures of 200° to 300° C., particularly a rubber adhesive or acrylic adhesive is preferably used. Such a low temperature-decomposable organic adhesive is advantageous in that it can decompose and volatilize early in the stage of heating to adhere to the product to be labeled through the silicone resin or glass powder.

Examples of the low temperature-decomposable organic adhesive include an organic adhesive made of a polymer such as natural rubber, synthetic rubber of the same type, butyl rubber, polyisoprene rubber, styrene-butadiene rubber, styrene-isoprene-styrene block copolymer rubber and styrene-butadiene-styrene block copolymer rubber, singly, and an organic adhesive obtained by incorporating from 10 to 300 parts by weight of a tackfying resin such as petroleum resin, terpene resin, rosin, xylene resin and coumarone-indene resin and a compounding additive such as softening agent, age resistor, colorant and filler in 100 parts by weight of such a polymer or a polymer comprising an acrylic or methacrylic alkyl ester polymer as a main component.

Where the pattern-forming sheet of the present invention is tentatively attached to a wet product such as pottery ready for burning, a hydrophilic adhesive such as polyvinyl alcohol adhesive, polyvinyl pyrrolidone adhesive, polyacrylamide adhesive and cellulose adhesive is preferably used. Such a hydrophilic adhesive comprises a water-soluble high molecular weight compound or hydrophilic high molecular weight compound such as polyvinyl alcohol, polyvinyl pyrrolidone, polyacrylamide, acrylic copolymer and polyvinyl methyl ether, a tackier such as glycerin, polyethylene glycol, polyether polyol, polyoxyethylene phenol ether and polyoxy-ethylene alkyl phenol ether, a crosslinking agent, a filler or other proper components incorporated therein.

The adhesive layer which thermally decomposes when heated can adhere to the product to be labeled through the glass powder or silicone resin contained in the pattern-forming sheet. In the present invention, the adhesive layer may further comprise a low-melting frit or the above-described silicone resin to enhance its adhesiveness to the product to be labeled.

The low-melting frit used is a material which can soften or melt at temperatures lower than a predetermined heating temperature to adhere to the product to be labeled. In general, a glass powder or a ceramic powder that vitrifies when heated may be used. Such a glass powder to be used is a proper glass powder, depending on the heating temperature. For example, if heating is conducted at a temperature of from 400° C. to 850° C., a lead glass powder, lead borosilicate glass powder, soda-lime glass, etc. may be used.

The provision of the adhesive layer on the pattern-forming sheet or label can be accomplished by a proper process corresponding to the process for the formation of an adhesive tape. For example, the adhesive substance may be applied to the pattern-forming sheet or label by a proper coating method such as doctor blade process and gravure roll coating process. Alternatively, the adhesive layer provided on a separator may be transferred to the pattern-forming sheet or label. A dot-patterned adhesive layer can be formed by a coating method such as rotary screen process. The thickness of the adhesive layer thus provided can be determined depending on the purpose, but is normally from 1 to 500 μm. The adhesive layer that has thus been provided is preferably covered by a separator or the like to protect itself against contamination or the like until the sheet or label is tentatively attached to the product to be labeled.

The formation of the label can be accomplished by patterning the ink-receptive layer of the pattern-forming sheet with an ink, engraving the pattern-forming sheet to form a hole or roughness pattern thereon or punching holes having a desired shape in the pattern-forming sheet. These pattern elements may be combined. Alternatively, patterns formed by other various methods may be combined.

The ink for forming the label used is a proper ink composition comprising an inorganic colorant as a color component. Examples of such an inorganic colorant used in the present invention include those exemplified as inorganic powders to be incorporated in the ink-receptive layer. Besides these inorganic powders, inorganic pigments, carbon, metal powders, other electrically-conductive or resistive substances, and dielectric substances may be properly used depending on the purpose. In general, inorganic pigments are used.

A preferred ink can be prepared by a process which comprises mixing an inorganic colorant and one or more organic binders made of wax or a low-melting resin optionally with a solvent by means of a proper kneader such as roll mill and pot mill to obtain a fluid matter in the form of paste. Such an ink can easily form an ink sheet by which a pattern can be directly provided to the ink-receptive layer in a heat transfer process by means of a heat transfer printer or the like.

The organic binder is not specifically limited and may be properly selected. Examples of such an organic binder that can be used in the present invention include those exemplified above as low temperature-decomposable resins constituting the pattern-forming sheet. Other examples of such an organic binder include polymers such as polyamide resins and petroleum resins, and waxes such as paraffin wax, carnauba wax, natural wax, ester wax, higher alcoholic wax, and higher amide wax. The use of such an organic binder is desirable from the standpoint of pattern forming properties. The content of such an organic binder can be properly determined, but is normally from about 10 to 50% by weight.

The ink composition may further comprise a proper additive such as a dispersant, flexibilizer and foaming agent incorporated therein besides the solvent. The solvent, dispersant, flexibilizer and foaming agent to be used are not specifically limited. Any known commercially available products may be used. Examples of such a solvent include toluene, isopropanol, and solvent naphtha. Examples of the flexibilizer include oils and fats, mineral oil, colza oil, vaseline, xylene resin, and silicone oil. The amount of these additives to be used can be properly determined depending on the purpose of the label. The ink is preferably prepared by kneading the compounds by means of a proper kneader such as roll mill, pot mill and three-roll mill.

The formation of a pattern with an ink is arbitrary. The pattern may be handwritten, stamped, or applied through a pattern-forming mask. Alternatively, a pattern formed on a transfer paper may be transferred to the pattern-forming sheet. The pattern may be printed with an ink on the pattern-forming sheet. The pattern formation by a printer is advantageous in that a desirable pattern can be efficiently formed with a high precision.

The ink sheet such as typewriter ribbon necessary for the formation of a pattern by means of a printer such as XY plotter and wire dot type, heat transfer type, impact type or ink jet type printer can be formed by retaining an ink on a substrate made of film or cloth by a coating method, impregnating method or the like. The substrate used is an ordinary material such as plastic films such as polyester film, polyimide film and fluororesin film, and cloth made of fiber such as polyamide fiber and polyester fiber. The ink sheet may be prepared in various forms suitable for heat transfer process, stamping process or stamp transfer process depending on the product to be patterned or patterning process.

The pattern formation is arbitrary. The pattern may be a typed pattern, designed pattern, bar code pattern or the like. Where an identification label is formed, it is preferred that an inorganic powder and a colorant be used in combination to provide good contrast or make a tone difference between the pattern-forming sheet and the ink pattern.

The step of patterning or shaping the pattern-forming sheet may be either before or after the tentative attachment of the pattern-forming sheet to the product to be labeled. Where a pattern is formed by a printer, it is common practice that the pattern-forming sheet is previously patterned to provide a label that is then tentatively attached to the product to be labeled.

Where the pattern-forming sheet is previously patterned, the surface of the pattern-forming sheet to be patterned may be protected by a separator as necessary until the sheet is exposed to a heating atmosphere. In the case of transfer process, the transfer paper may be left unstripped to serve as a separator. The tentative attachment of the pattern-forming sheet or label to the product to be labeled may be accomplished by an automatic bonding process employing robots or the like.

The pattern-forming sheet or label can be used for various purposes. For example, the pattern-forming sheet or label can be used to paint a picture on various products such as pottery, glass products, ceramic products, metallic products and enameled bodies. The pattern-forming sheet or label can be used to provide a heat-resistant substrate such as a ceramic substrate with an identification mark such as bar code. Further, the pattern-forming sheet or label can be used to provide thick film hybrid IC substrates with a circuit pattern. Moreover, the pattern-forming sheet or label can be used to provide various electronic parts with a pattern such as electrode, resistor and dielectric substance. Accordingly, the product to be patterned is not specifically limited. It may be a wet product such as unburned ceramic molding and unburned pottery. In this case, the label tentatively attached to the product may be burned so that the ceramic molding can be subjected to heat treatment at the same time. The product to be labeled may be in an arbitrary form such as a tablet and vessel.

The present invention will be further described in the following examples, but the present invention should not be construed as being limited thereto.

EXAMPLE 1

To a xylene solution containing 30 parts (the term "parts" as used herein is "by weight") of a polyphenyl methyl siloxane having an average molecular weight (calculated as a polystyrene, and hereinafter the same) of about 300,000 and a hydroxyl group content of 1 mol % and 40 parts of a polyvinyl methacrylate having an average molecular weight of 200,000 were added 15 parts of a titania powder having an average particle diameter of 0.2 µm and 15 parts of a talc powder having an average particle diameter of 0.8 µm. The resulting mixture was then stirred to obtain a homogeneous dispersion. The dispersion thus obtained was applied to a 50 µm thick polyester separator which had been treated with a silicone release agent by a doctor blade process, and then dried to form a 10 µm thick ink-receptive layer thereon.

A homogeneous xylene solution containing 50 parts of a lead oxide-containing borosilicate glass having a softening point of 375° C. and 50 parts of the same polybutyl methacrylate as used above was applied to the above ink-receptive layer by a doctor blade process, and then dried to form a 60 µm thick base layer.

Separately, a toluene solution containing 100 parts of a polybutyl acrylate having an average molecular weight of about 1,000,000 and 20 parts of a polyphenyl methyl siloxane having an average molecular weight of about 10,000 was applied to a 70 µm thick glassine paper separator which had been treated with a silicone release agent, and then dried to form a 20 µm thick adhesive layer thereon. The adhesive layer was then transferred to the base layer to obtain a pattern-forming sheet.

Still separately, to a hot-melt solution containing 40 parts of a carnauba wax, 30 parts of a paraffin wax and 30 parts of an ethylene-vinyl acetate copolymer were added 100 parts of a black pigment having an average particle diameter of 0.5 µm made of chromium oxide, iron oxide, cobalt oxide and manganese oxide. The mixture was then homogeneously stirred to prepare an ink. The ink thus prepared was gravure-coated onto a 6 µm thick polyester film, and then dried and retained to obtain an ink sheet comprising an ink layer having a thickness of 6 µm. With this ink sheet, a bar code pattern was then provided to the ink-receptive layer of the pattern-forming sheet by means of a heat transfer printer. Thus, a label was obtained.

EXAMPLE 2

The procedure of Example 1 was followed to prepare a pattern-forming sheet and label except that the base layer further contained 5 parts of a polyphenyl methyl siloxane having an average molecular weight of 200,000.

EXAMPLE 3

The procedure of Example 1 was followed to prepare a pattern-forming sheet and label except that an adhesive layer further comprising 10 parts of a glass powder comprising PbO, $B_2O_3$ and ZnO as main components was transferred to one side of the pattern-forming sheet.

EXAMPLE 4

The procedure of Example 1 was followed to prepare a pattern-forming sheet and label except that an adhesive layer comprising a polyorganosiloxane having an average molecular weight of about 500,000 was transferred to one side of the pattern-forming sheet.

EXAMPLE 5

The procedure of Example 3 was followed to prepare a pattern-forming sheet and label except that the pattern-forming sheet according to Example 1 was punched to form a pattern-forming sheet having holes at a pitch of 50 μm.

EXAMPLE 6

A coating solution was patternwise applied to a separator by a rotary screen process, and then dried to form a 30 μm thick adhesive layer dots having a diameter of 0.7 mm which run zigzag at a pitch of 1.0 mm. The adhesive layer was then transferred to a pattern-forming sheet in the same manner as in Example 1. An ink pattern was then provided to the pattern-forming sheet to obtain a label.

EXAMPLE 7

A 200 μm thick glass cloth was impregnated with a base layer-forming agent according to Example 1. An ink-receptive layer and an adhesive layer according to Example 1 were then provided on the glass cloth to obtain a pattern-forming sheet. The pattern-forming sheet was then processed in the same manner as in Example 1 to obtain a label.

COMPARATIVE EXAMPLE

To 100 parts of a binder made of an acrylic polymer having an average molecular weight of about 100,000 were added 150 parts of a glass powder having an average particle diameter of 10 μm comprising PbO, $SiO_2$, $B_2O_3$ and $Al_2O_3$ as main components and 50 parts of a titania powder having an average particle diameter of 0.3 μm. The mixture was then stirred by means of a ball mill to obtain a homogeneous dispersion. The dispersion thus obtained was applied to a 70 μm thick glassine paper separator which had been treated with a silicone release agent by a doctor blade process, and then dried. The separator was then peeled off to obtain a 50 μm thick pattern-forming sheet.

Separately, a toluene solution of a polybutyl acrylate having an average molecular weight of about 500,000 was applied to the same separator as used above by a doctor blade process, and then dried to form a 30 μm thick adhesive layer. The adhesive layer thus formed was then transferred to one side of the above pattern-forming sheet.

A bar code pattern was then formed on the exposed surface of the above pattern-forming sheet with an ink from a heat transfer process ink sheet by means of a heat transfer printer to obtain a label. The ink sheet used had been formed by a process which comprises mixing 50 parts of a black pigment having an average particle diameter of 0.5 μm made of chromium oxide, iron oxide, cobalt oxide and manganese oxide, 100 parts of a glass powder having an average particle diameter of 2 μm comprising PbO, $SiO_2$, $B_2O_3$ and $Al_2O_3$ as main components and 100 parts of a paraffin wax with 80 parts of hexane by means of a ball mill, gravure-coating the ink onto a 6 μm thick polyester film, and then drying the coated material so that the ink is retained thereon to form a 5 μm thick ink layer.

Evaluation test
Reflectance

The separator was each peeled off the labels obtained in the above Examples and Comparative Example. The labels were each tentatively attached to a glass plate through its adhesive layer. The laminates were each burned at a temperature of 440° C. for 30 minutes (in air). Thus, glass plates were obtained each having a burned label firmly bonded thereto. The burned label had a sharp black bar code pattern formed on a white background. The glass plates were each then measured for reflectance on the white background with light having a wavelength of 633 nm.

When the above burning was conducted, the organic components such as acrylic polymer in the pattern-forming sheet or adhesive layer were thermally decomposed, but the polyorganosiloxane remained cured in the Examples. On the contrary, in the Comparative Example, the organic components such as acrylic polymer were thermally decomposed, and the resulting label was found to have been burned through the glass powder.

Fixing force

The burned label thus obtained was dipped in a 8 wt % aqueous solution of sodium hydroxide at 80° C. or a 12 wt % aqueous solution of hydrofluoric acid at 25° C. for 30 seconds, and then taken out therefrom. The surface of the label thus treated was then rubbed with a non-woven cloth to determine the retention of the pattern.

The results obtained are shown in the Table.

TABLE

| Example No. | Reflectance after burning (%) | Pattern retention | |
|---|---|---|---|
| | | NaOH aq. | HF aq. |
| Example 1 | 55 | No change | No change |
| Example 2 | 55 | No change | No change |
| Example 3 | 53 | No change | No change |
| Example 4 | 60 | No change | No change |
| Example 5 | 61 | No change | No change |
| Example 6 | 60 | No change | No change |
| Example 7 | 58 | No change | No change |
| Comparative Example | 54 | Disappeared | Disappeared |

Glass powder sheets having a predetermined dimension were continuously formed. At the same time, the separator was peeled off the label obtained in Example 1. The label was then tentatively attached to the glass powder sheets through its adhesive layer. The laminates were each burned at a temperature of 440° C. for 30 minutes (in air). Thus, glass plates were continuously obtained each having a burned label firmly bonded thereto, the burned label having a sharp black bar code pattern formed on a white background.

The burned label exhibited the same reflectance and pattern retention against an aqueous solution of sodium hydroxide or hydrofluoric acid as above.

While the invention has been described in detail and with reference to specific embodiments thereof, it will be apparent to one skilled in the art that various changes and modifications can be made therein without departing from the spirit and scope thereof.

What is claimed is:

1. A pattern-forming sheet for use as a label to be heat bonded to a product, said sheet comprising a bonded laminate of

13

(1) a base layer obtained by shaping a glass powder into a sheet with a decomposable acrylic polymer, said decomposable acrylic polymer having a decomposition temperature lower than the melting temperature of said glass powder; and (2) an ink-receptive layer formed of a silicone resin containing an inorganic powder.

2. The pattern-forming sheet according to claim 1 wherein said base layer further incorporates a degasser made of an inorganic powder having a melting temperature higher than the melting temperature of said glass powder.

3. The pattern-forming sheet according to claim 1 wherein said silicone resin of said ink-receptive layer can undergo decomposition and condensation when heated to a temperature lower than the melting temperature of said glass powder to create a cured product that turns to silica.

4. The pattern-forming sheet according to claim 3 wherein said silicone resin of said ink-receptive layer is a polyorganosiloxane containing a white inorganic powder and a decomposable resin.

5. The pattern-forming sheet according to any of claims 1 to 4, wherein said base layer further incorporates a silicone resin.

6. The pattern-forming sheet according to claim 5 wherein said base layer includes a reinforcing substrate positioned such that the ink-receptive layer is not adjacent to the reinforcing substrate.

7. The pattern-forming sheet according to claim 6 further comprising a pressure-sensitive adhesive layer bonded to said base layer.

8. The pattern-forming sheet according to claim 7 wherein said pressure-sensitive adhesive layer further comprises:

a decomposable adhesive substance having a decomposition temperature lower than the melting temperature of the glass powder; and at least one of a frit and a silicone resin.

9. The pattern-forming sheet according to claim 8 wherein said pressure-sensitive adhesive layer is distributed in a dotted pattern.

10. The pattern-forming sheet according to claim 9 wherein said reinforcing substrate is made of a porous material.

11. The pattern-forming sheet according to claim 10 wherein said sheet is vented by forming fine through-holes therethrough.

12. The pattern-forming sheet according to claim 11 further comprising a pattern of inorganic colorant placed on said ink-receptive layer to form a label.

13. A label to be bonded to a product at a bonding temperature comprising a bonded laminate of:

(1) a base layer obtained by shaping a glass powder into a sheet with a decomposable acrylic polymer, said glass powder having a melting temperature lower than said bonding temperature, said decomposable acrylic polymer having a decomposing temperature lower than said melting temperature;

(2) an ink-receptive layer formed of a silicone resin containing an inorganic powder; and (3) a pattern of inorganic colorant placed on said ink-receptive layer.

14. The label according to claim 13 further comprising a pressure-sensitive adhesive layer bonded to said base layer.

15. The label according to claim 14 wherein said base layer further incorporates a degasser made of an inorganic

14 powder having a melting temperature higher than said melting temperature of said glass powder, and wherein said silicone resin of said ink-receptive layer can undergo decomposition and condensation when heated to a temperature lower than said melting temperature of said glass powder to create a cured product that turns to silica.

16. The label according to claim 15 wherein said silicone resin of said ink-receptive layer is a polyorganosiloxane containing a white inorganic powder and a decomposable resin.

17. The label according to claim 16 wherein said base layer further includes a reinforcing substrate.

18. A pattern-forming sheet comprising a bonded laminate of:

(1) a base layer obtained by shaping a glass powder having a melting temperature of from 320° C. to 500° C. into a sheet with a decomposable acrylic polymer having a decomposition temperature lower than the melting temperature of said glass powder; and (2) an ink-receptive layer formed of a silicone resin containing an inorganic powder.

19. The pattern-forming sheet according to claim 18 wherein said base layer further incorporates a degasser made of an inorganic powder having a melting temperature higher than the melting temperature of said glass powder.

20. The pattern-forming sheet according to claim 18 wherein said silicone resin of said ink-receptive layer can undergo decomposition and condensation when heated to a temperature lower than the melting temperature of said glass powder to create a cured product that turns to silica.

21. The pattern-forming sheet according to claim 20 wherein said silicone resin of said ink-receptive layer is a polyorganosiloxane containing a white inorganic powder and a decomposable resin.

22. The pattern-forming sheet according to any of claims 18 to 21, wherein said base layer further incorporates a silicone resin.

23. The pattern-forming sheet according to claim 22 wherein said base layer includes a reinforcing substrate positioned such that the ink-receptive layer is not adjacent to the reinforcing substrate.

24. The pattern-forming sheet according to claim 23 further comprising a pressure-sensitive adhesive layer bonded to said base layer.

25. The pattern-forming sheet according to claim 24 wherein said pressure-sensitive adhesive layer further comprises:

a decomposable adhesive substance having a decomposition temperature lower than the melting temperature of the glass powder; and at least one of a frit and a silicone resin.

26. The pattern-forming sheet according to claim 25 wherein said pressure-sensitive adhesive layer is distributed in a dotted pattern.

27. The pattern-forming sheet according to claim 26 wherein said reinforcing substrate is made of a porous material.

28. The pattern-forming sheet according to claim 27 wherein said sheet is vented by forming fine through-holes therethrough.

29. The pattern-forming sheet according to claim 28 further comprising a pattern of inorganic colorant placed on said ink-receptive layer to form a label.

* * * * *